Dec. 5, 1939.  V. MILICH  2,182,445
CASTER
Filed July 23, 1938
Fig. 1.
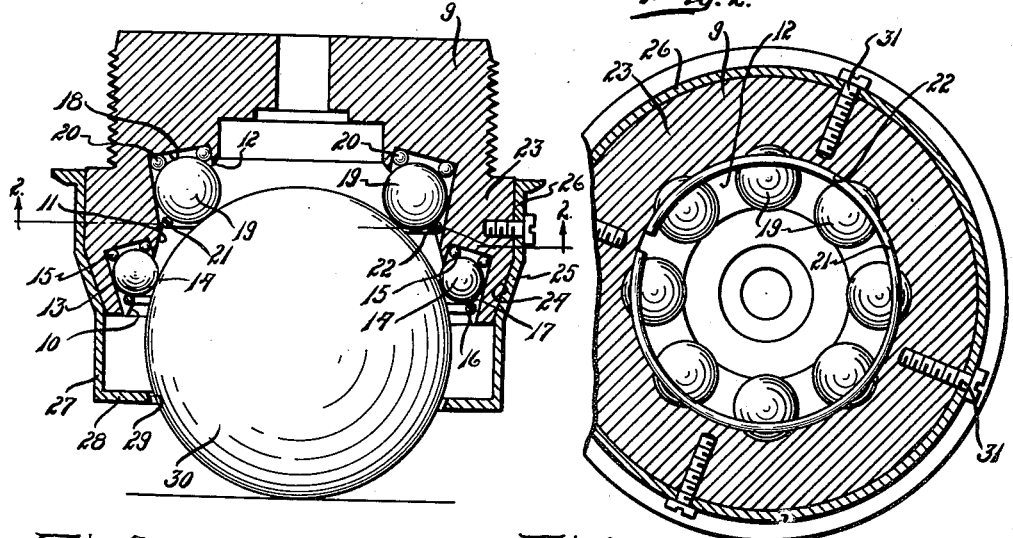
Fig. 4.
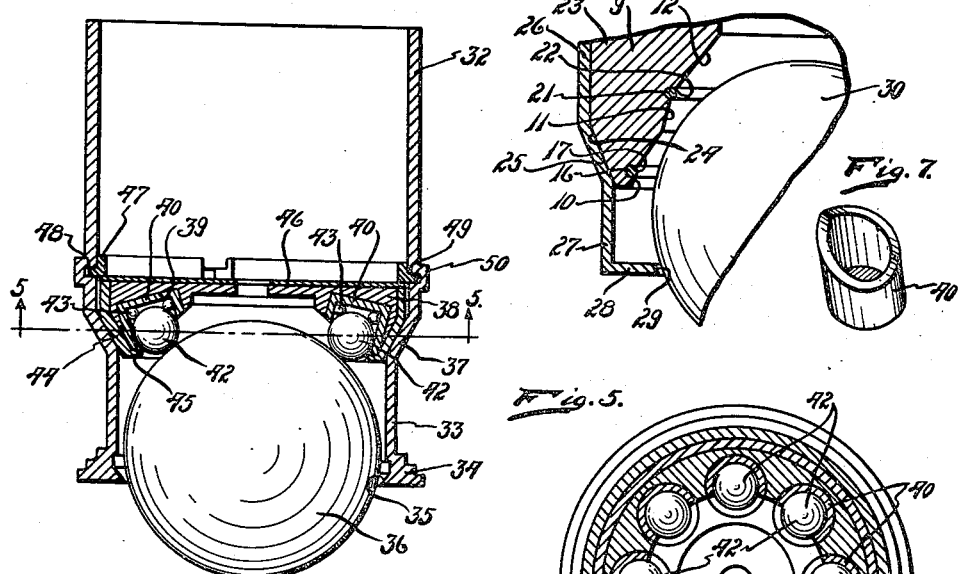
Fig. 6.
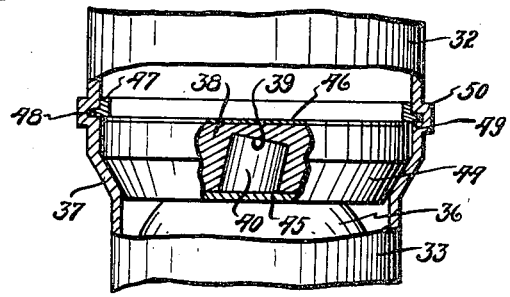
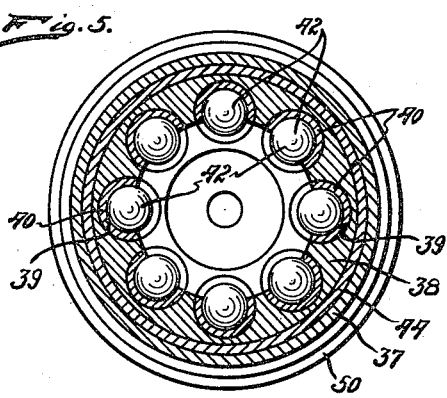
INVENTOR.
VLADA MILICH
BY Thos. Donnelly
ATTORNEY.

Patented Dec. 5, 1939

2,182,445

UNITED STATES PATENT OFFICE 2,182,445

CASTER

Vlada Milich, Detroit, Mich.

Application July 23, 1938, Serial No. 220,832

5 Claims. (Cl. 16—26)

My invention relates to a new and useful improvement in a caster and has for its object the provision of a caster which will be simple in structure, economical of manufacture, compact, durable and highly efficient in use.

Another object of the invention is the provision in a caster of a spherical contact member rotatably engaging a plurality of circumferential rows of rotatable members such as ball bearings or the like so arranged and constructed as to permit the use of a contact member of maximum diameter thus rendering it possible to form this contact member from any suitable material, even a soft and yielding rubber.

Another object of the invention is the provision in a caster of this type of a supporting member having a plurality of rows of circumferentially arranged balls mounted in individual pockets and releasably retained therein by releasable means.

Another object of the invention is the provision in a caster of this type of a ball retainer formed from a comparatively soft material and having a plurality of spaced pockets formed therein lined with metal or other hard wear-resisting material.

Other objects will appear hereinafter.

The invention consists in the combination and arrangement of parts hereinafter described and claimed.

The invention will be best understood by a reference to the accompanying drawing which forms a part of this specification, and in which, Fig. 1 is a central, vertical, sectional view of the invention.

Fig. 2 is a sectional view taken on line 2—2 of Fig. 1 with parts broken away.

Fig. 3 is a fragmentary, sectional view of the invention.

Fig. 4 is a central, vertical, sectional view of a modified form of the invention.

Fig. 5 is a sectional view taken on line 5—5 of Fig. 4.

Fig. 6 is a fragmentary, side elevational view of the form shown in Fig. 4 with parts broken away and parts shown in section.

Fig. 7 is a perspective view of a liner used in the invention.

In the form shown in Fig. 1, I provide a retainer 9 having a threaded portion adapted to thread into a suitable receptacle mounted on the article on which the caster is to be used. The lower end of this retainer 9 is hollowed out to provide a cup-shaped structure. The inner surface of this hollowed-out portion comprises a plurality of surfaces 10, 11 and 12 each of which is inclined to the axis of the retainer 9 but at a different angle. Formed in the retainer 9 at the inclined surface 10 are a plurality of small pockets 13 in each of which is positioned a ball 14 bearing against a plurality of small balls 15 which are placed loosely in the pocket 13. A split resilient ring 16 engages in a groove 17 formed in the surface 10 to serve as a retainer for retaining the balls 14 in the recesses or pockets 13.

Formed in the surface 11 are a plurality of recesses or pockets 18 larger than the pockets 13 and in each of these pockets 18 is seated a ball 19 of larger diameter than the balls 14, these balls 19 bearing against small ball bearings 20 which are loosely positioned in the pocket or recess 18. A split resilient ring 21 engages in a groove 22 formed in the surface 11 and serves as a retainer for retaining the balls 18 in position. The lower portion of the retainer 9 is formed larger than the upper portion, the periphery of this lower portion being concentric with the axis of the portion 9 at the part 23 and terminating in a terminal portion 24 which is inclined to the axis of the retainer 9 to form a tapered end on the enlarged portion of the retainer.

A cup-shaped guard is provided having a portion 25 to snugly engage the inclined surface 24 and a portion 26 to snugly engage the portion 23 of the retainer. Depending from the portion 25 is the axially directed portion 27 having the inturned flange 28 which serves as a bottom for this cup-shaped member and in which is formed an opening 29 of less diameter than the diameter of the spherical contact member 30 which is positioned in engagement with the balls 14 and 19. The size of the opening 29 is such as to guard the ball 30 against removal from operative position, this ball being partially enclosed by this cup-shaped guard. The spherical contact member 30, when engaging the balls 14, will also be in engagement with the balls 19, this engagement extending around the rows of balls. This guard is secured in position by means of screws 31.

With a caster constructed in this manner, a most efficient device is afforded and one which permits of easy and quick assembly and disassembly of the various parts.

In the modified form the retainer comprises the cylindrical extensions 32 having the reduced portion 33 adjacent one end thereof provided with a reinforced collar flange 35 framing the opening through which a portion of the spherical contact member projects, this opening being of less diameter than the contact member 36. The reduced portion 33 connects to the main body of the retainer by the inclined portion 37 which serves as a seat for a ball retaining disk 38 which is formed from fiber or other suitable material which is soft in comparison to most metals. Formed in this disk 38 is a plurality of pockets 39 which are lined by the metallic liners 40. These liners 40 are cup-shaped and it will be noted that their axes are coincident with the axes of the pockets in which positioned and inclined to the axis of the disk with their bases engaging the bases of the pockets and also inclined to the axis of the disk. It will also be noted that the plane of the open end of the liners 40 is inclined to the axis of the liner. Engaging in each of these pockets is a ball 42 which bears against the smaller ball bearings 43 loosely positioned in the pockets 40. This disk 38 is embraced by a metallic ring 44 having at one end the inturned flange 45 which serves to engage the balls 42 and prevent their removal from the pockets. This ring 44 rests upon the inclined surface 37 which serves as a seat therefor. Engaging the upper face of the disk 38 is a metallic plate 46 over which engages the split resilient ring 47 having the outwardly directed flange 48 engageable in the groove 49 formed in the inner face of the member 32, this member 32 having a peripheral boss 50 in the location of the groove 49 to provide the necessary structure.

The advantages referred to in the preferred form of construction are present in this type of structure as well. This type of structure, however, lends itself to mounting on articles in which the preferred form would not be well adapted. The form shown in Fig. 4 is of lighter construction and is somewhat more economical in manufacture.

While I have illustrated and described the preferred forms of construction, I do not wish to limit myself to the precise details of structure shown, but desire to avail myself of such variations and modifications as may come within the scope of the appended claims.

What I claim as new is:

1. A caster of the class described, comprising: a tubular cylindrical retainer, one end portion thereof being reduced in diameter relatively to the other end portion, the portion connecting said end portions being of conical formation; a retaining disk; a metallic ring embracing said retaining disk, said retaining disk having a portion with a cylindrical periphery and a portion with a conical periphery, said ring corresponding in shape to the peripheral shape of said disk and adapted for snug engagement with the inner surface of said retainer, the conical portion of said ring resting upon the conical portion of said retainer, there being a plurality of circumferentially spaced pockets formed in said disk; an antifriction member in each of said pockets; an inwardly directed flange on the end of the reduced portion of said retainer; a spherical contact member engaging in said reduced portion and being of less diameter than said reduced portion of said retainer and of greater diameter than the opening surrounded by said flange, said contact member engaging said antifriction members.

2. A caster of the class described, comprising: a tubular cylindrical retainer, one end portion thereof being reduced in diameter relatively to the other end portion, the portion connecting said end portions being of conical formation; a retaining disk; a metallic ring embracing said retaining disk, said retaining disk having a portion with a cylindrical periphery and a portion with a conical periphery, said ring corresponding in shape to the peripheral shape of said disk and adapted for snug engagement with the inner surface of said retainer, the conical portion of said ring resting upon the conical portion of said retainer, there being a plurality of circumferentially spaced pockets formed in said disk; an antifriction member in each of said pockets; an inwardly directed flange on the end of the reduced portion of said retainer; a spherical contact member engaging in said reduced portion and being of less diameter than said reduced portion of said retainer and of greater diameter than the opening surrounded by said flange, said contact member engaging said antifriction members; and a metallic liner for each of said pockets.

3. A caster of the class described, comprising: a tubular cylindrical retainer, one end portion thereof being reduced in diameter relatively to the other end portion, the portion connecting said end portions being of conical formation; a retaining disk; a metallic ring embracing said retaining disk, said retaining disk having a portion with a cylindrical periphery and a portion with a conical periphery, said ring corresponding in shape to the peripheral shape of said disk and adapted for snug engagement with the inner surface of said retainer, the conical portion of said ring resting upon the conical portion of said retainer, there being a plurality of circumferentially spaced pockets formed in said disk; an antifriction member in each of said pockets; an inwardly directed flange on the end of the reduced portion of said retainer; a spherical contact member engaging in said reduced portion and being of less diameter than said reduced portion of said retainer and of greater diameter than the opening surrounded by said flange, said contact member engaging said antifriction members; and a cup-shaped metallic liner mounted in each of said pockets, said pockets having their longitudinal axes and their bases inclined to the axis of said disk, the base of said liners lying in engagement with the base of the pocket in which positioned and the outer edge of said liner being cut to conform to the inner surface of said disk, said disk on its inner surface being dished out to provide a concave structure.

4. In a caster of the class described, a retaining disc having a centrally located recess formed in one of its faces and provided with a circumferential row of spaced pockets opening at the face of said recess; a cup shaped liner for each of said pockets, the base of said liner engaging the base of the pocket in which positioned and the plane of the open end of said liner being inclined to the axis of the liner and lying flush with the face of said recess.

5. In a caster of the class described, a retaining disc having a centrally located recess formed in one of its faces and provided with a circumferential row of spaced pockets opening at the face of said recess; a cup shaped liner for each of said pockets, the base of said liner engaging the base of the pocket in which positioned and the plane of the open end of said liner being inclined to the axis of the liner and lying flush with the face of said recess; an antifriction ball in each of said liners and projecting outwardly from the open end thereof; and means embracing said retaining disc and engaging said balls for preventing their dislodgment from said liners.

VLADA MILICH.